UNITED STATES PATENT OFFICE.

JOHN HOPKINS, OF BROWNSVILLE, PENNSYLVANIA.

IMPROVEMENT IN BREWING AND PRESERVING ALCOHOLIC DRINKS.

Specification forming part of Letters Patent No. 6,430, dated May 8, 1849.

*To all whom it may concern:*

Be it known that I, JOHN HOPKINS, of West Brownsville, in the county of Washington and State of Pennsylvania, have discovered a new and useful composition of matter, which I propose to employ in the refining of liquors and as a counteractive of acetous fermentation generally, but more particularly as a substitute for hops in brewing, yeast-making, and distilling; and I do hereby declare that the following is a full and exact description of the manner of preparing and using the same.

The nature of my discovery consists in the preparation of wood by reducing it into a state of fine division or of an extract of wood, either of which I employ in various ways, but chiefly in the manufacture and refinement of fermented and unfermented liquors, for the purpose of counteracting the tendency which they have to acetous fermentation and to correct and improve their flavor. There are many different kinds of wood of which the preparation may be made, but the oak is generally preferable.

I make the extract by reducing the whole or any part of the substance of the tree into a state of fine division and then macerating it in hot or cold water until the bulk of the soluble matter is dissolved and the extract is of sufficient strength. I then decant the clear liquid into barrels or other suitable vessels and stow it away in a dry cellar or other suitable place, where the temperature never descends to the freezing-point, because its anti-acetous properties are impaired by frost.

The manner in which this preparation is used in brewing is by adding to the worts at the proper stage of the process a quantity of the extract equal to one twenty-fifth part, more or less, of the quantity of ale, beer, or porter being made, if the liquor is designed for summer use or to be exported to a warm climate; but if the brewing is carried on in cold weather and the liquor designed for winter use, I employ a less proportion of the extract, say two-thirds, more or less, of the quantity employed in the first case. These proportions have been found to answer well upon a small scale; but further experiments upon a more extensive scale may go to show that some other proportions will be better; and since the extract of the wood is cheaper than the malt liquor there will be no temptation to limit the quantity too much, as in the case of hops, which are comparatively dearer, and the quantity used can be varied without inconvenience.

When making yeast for distilling purposes I add the extract at the time of scalding the meal, or whatever may be substituted therefor to furnish the gluten or basis of the fermenting principle. In the preparation of a suitable quantity of yeast for the daily use of a distillery whose per diem consumption of grain is about twenty-five bushels I employ about a pint of strong extract. Where larger quantities of grain are distilled at a time a less proportionate quantity of yeast is employed, and therefore less of the extract. I employ the extract in the same manner to prepare baker's yeast, and in any proportion that experience in each particular locality may demonstrate to be the best.

In fining wines or other fermented liquors, or in correcting their tendency to acidity, I simply add to them a quantity of the extract and then filter them through the finely-divided wood, varying the proportions used according to the circumstances of each particular case. The precise quantity of extract it would be proper to use in these cases will have to be left to the discretion of a person experienced in the management of liquors, for I do not propose by my discovery to dispense with skill and experience in this branch of the arts, but merely to enable such as are already skilled by its proper and judicious use to improve the quality of their liquors.

In the preparation of unfermented drinks or liquid medicines the extract is only mixed with them to prevent fermentation; but it sometimes operates incidentally to improve their flavor.

To render new whisky or other raw liquor bland and mild, I find in most cases that it is sufficient to filter it, sometimes warm and at other times cold, according to circumstances, through a stratum of the wood in a state of fine division, being careful not to dissolve more of the soluble matter of the wood than is necessary, as an excess of it might deteriorate the flavor of the liquor.

What I claim as my discovery, and desire to secure by Letters Patent, is—

The preparation and employment of oak or other woods possessing similar chemical properties or an extract of such woods, substantially as herein described, as a substitute for hops in brewing, distilling, and yeast-making to refine and improve the flavor of spirituous liquors, as a counteractive of acetous fermentation generally in wines and other fermented liquors, in sirups, vegetable extracts, and other unfermented liquids, and to correct and improve the flavor of stale wines, cider, or beer.

JOHN HOPKINS.

Witnesses:
  G. W. CASS,
  P. H. WATSON.